(12) United States Patent
Friedrichs

(10) Patent No.: US 7,226,254 B2
(45) Date of Patent: Jun. 5, 2007

(54) ROD-SHAPED TOOL FOR MACHINING A WORKPIECE

(76) Inventor: Arno Friedrichs, Gruenbaum 3, Kulmbach (DE) 95326

( * ) Notice: Subject to any disclaimer, the term of this patent is extended or adjusted under 35 U.S.C. 154(b) by 458 days.

(21) Appl. No.: 10/488,181

(22) PCT Filed: Aug. 13, 2002

(86) PCT No.: PCT/EP02/09038

§ 371 (c)(1),
(2), (4) Date: Mar. 1, 2004

(87) PCT Pub. No.: WO03/020462

PCT Pub. Date: Mar. 13, 2003

(65) Prior Publication Data

US 2005/0084351 A1 Apr. 21, 2005

(30) Foreign Application Priority Data

Aug. 29, 2001 (DE) .............................. 101 42 265

(51) Int. Cl.
*B23B 51/00* (2006.01)
*B23B 51/06* (2006.01)
(52) U.S. Cl. ........................................ 408/226; 408/59
(58) Field of Classification Search .................. 408/57, 408/59, 226, 227, 229, 230
See application file for complete search history.

(56) References Cited

U.S. PATENT DOCUMENTS 839,461 A * 12/1906 Eastman ...................... 408/226
2,348,874 A * 5/1944 Andreasson ................. 408/57
2,482,687 A * 9/1949 Mueller et al. ............... 138/89
2,903,921 A 9/1959 Andreasson ................... 77/68
4,583,888 A * 4/1986 Mori et al. .................... 408/59
4,826,364 A 5/1989 Grunsky ....................... 408/59
5,234,293 A * 8/1993 Mena ........................... 408/57
5,993,120 A * 11/1999 Giessler ....................... 408/59
6,045,301 A * 4/2000 Kammermeier et al. ...... 408/57
6,210,083 B1 * 4/2001 Kammermeier et al. .... 408/1 R

FOREIGN PATENT DOCUMENTS

| DE | 8002631 U1 | 7/1980 |
| DE | 19522837 A1 | 1/1997 |
| DE | 19942966 A1 | 3/2001 |
| GB | 571403 | 8/1945 |
| JP | 11114714 A * | 4/1999 |
| WO | WO 200056490 A1 * | 9/2000 |
| WO | WO 2004026165 A1 * | 4/2004 |

* cited by examiner

*Primary Examiner*—Daniel W. Howell
(74) *Attorney, Agent, or Firm*—Jacobson Holman PLLC

(57) ABSTRACT

The invention relates to a rod-shaped tool made of sintered material that is used to machine a workpiece. Said tool comprises a rod center axis (1), a shaft area (6) and a chip space area (5) adjacent thereto in the direction of the rod center axis (1). The tool has at least one outside chip space (4), which encircles the rod center axis (1), in the chip space area (5) but not in the shaft area (6). The chip space (4) is situated at a minimum distance (a) from the rod center axis (1). A central recess (7) extends in the direction of the rod center axis (1) over the shaft area (6) whereby leading up and into the chip space area (5). The central recess has, in the chip space area (5), a non-circular cross-section and is situated at a maximum distance (A) from the rod center axis (1), said maximum distance being at least as large as the minimum distance (a)

15 Claims, 6 Drawing Sheets

ROD-SHAPED TOOL FOR MACHINING A WORKPIECE

This is a nationalizaton of PCT/EP02/09038 filed Aug. 13, 2002 and published in German.

DESCRIPTION

The present invention relates to a rod-shaped tool of sintered material for machining a workpiece, for example a drilling, milling or reaming rod, with a rod centre axis, a shank region and a chip chamber region adjoining the shank region in the direction of the rod centre axis, wherein the tool has, in the chip chamber region, at least one chip chamber at the outer side and encircling the rod centre axis and, in the shank region, no chip chamber, wherein the chip chamber has a minimum spacing from the rod centre axis.

Tools of that kind are generally known. Every commercially available metal drill bit is constructed in that manner.

It is additionally known from DE 199 42 966 A1 to incorporate, in a tool according to the category, eccentrically arranged channels which together with the chip chambers extend helically around the rod centre axis and serve for the feed of coolant or lubricant to the tool tip.

A rod-shaped tool for machining a workpiece is known from DE 19 22 837 A1, which has a rod centre axis, a shank region and a chip chamber region adjoining the shank region in the direction of the rod centre axis. The tool has, in the chip chamber region, two substantially axially extending chip chambers at the outer side and, in the shank region, no chip chamber of that kind. The chip chambers have a minimum spacing from the rod centre axis.

A rod-shaped tool for milling a material which is to be machined is known from DE 80 02 631 U1, which has a rod centre axis, a shank region and a chamber region adjoining the shank region in the direction of the rod centre axis. The tool has, in the chamber region, chambers at the outer side which have a minimum spacing from the rod centre axis. In the shank region it has no chambers of that kind. The tool additionally has a centre recess, which extends in the direction of the rod centre axis over the shank region and as far as into the chamber region and has a non-circular cross-section in the chamber region and which in the chamber region has a maximum spacing from the rod centre axis at least as large as the minimum spacing.

A rod-shaped tool for machining a workpiece is known from GB-A-571 403, which tool has a rod centre axis, a shank region and a chip chamber region adjoining the shank region in the direction of the rod centre axis. In the chip chamber region the tool has at least one chip chamber at the outside and extending around the rod centre axis, but none in the shank region. The chip chamber has a minimum spacing from the rod centre axis. The tool has a circular centre recess which extends in the direction of the rod centre axis over the shank region as far as into the chip chamber region. The maximum spacing of the centre recess from the rod centre axis is thus less than the minimum spacing which the chip chamber has from the rod centre axis.

A rod-shaped tool for machining a workpiece is known from U.S. Pat. No. 2,903,921, which tool has a rod centre axis, a shank region and a chip chamber adjoining the shank region in the direction of the rod centre axis, wherein the tool has in the chip chamber region two chip chambers at the outside and extending around the rod centre axis and in the shank region has no chip chambers of that kind, wherein the chip chambers have a minimum spacing from the rod centre axis. The tool has two recesses which are arranged symmetrically with respect to the rod centre axis and are separate from one another and which each have a non-circular cross-section and a maximum spacing from the rod centre axis which is greater than the minimum spacing of the chip chambers from the rod centre axis.

A disclosure content which is comparable with that of DE 199 42 966 A1 can be inferred from U.S. Pat. No. 4,826,364.

The object of the present invention consists in developing a tool according to category in such a manner that for the same performance capability it can be produced with reduced use of material.

The object is fulfilled in that the tool has a closed centre recess which is material-free in the region of the rod centre axis, extends in the direction of the rod centre axis over the shank region and as far as into the chip chamber region, has a non-circular cross-section in the chip chamber region and, in the chip chamber region, has a maximum spacing from the rod centre axis which is at least as large as the minimum spacing.

The tool is thereby constructed in both the shank region and the chip chamber region not to be solid, but to be hollow. Nevertheless, a sufficient stability and load-bearing capability of the tool is given.

If the maximum spacing in the shank region is at least as large as a minimum spacing, preferably even larger than the minimum spacing, a particularly large saving of material results. This is particularly so if the shank region has a shank outer diameter and the maximum spacing is at least 0.2 times the shank outer diameter. In order not to detract from the performance capability of the tool, the maximum spacing should, however, be at most 0.45 times the shank outer diameter.

If the cross-section of the centre recess in the chip chamber region is matched to an outer cross-section of the chip chamber region so that the chip chamber region overall has a substantially constant material thickness, an optimisation of the material saving results.

At least one guide channel, which is arranged eccentrically with respect to the rod centre axis and which is connected in communicating manner with the centre recess, for a coolant or lubricant can extend in a part section of the chip chamber region.

The centre recess can, in the shank region, selectably have a circular or a non-circular cross-section. In the latter case, the cross-section can be, for example, oval, elliptical or polygonal or have at least one recess or at least one projection. In that case, a particularly good transfer of force by an entrainer inserted into the centre recess is possible by way of a non-circular cross-section.

If the centre recess in the shank region has a cross-section which is larger in a part section facing the chip chamber region than at its end remote from the chip chamber region, the tool can be clamped in particularly simple manner by a tool holder. The centre recess can for that purpose have a slight conicity and/or be constructed in its part section facing the chip chamber region to be hammerhead-like or dovetail-shaped.

Further advantages and details are evident from the following description of an example of embodiment in conjunction with the drawings, in which in basic illustration:

Figure 1:
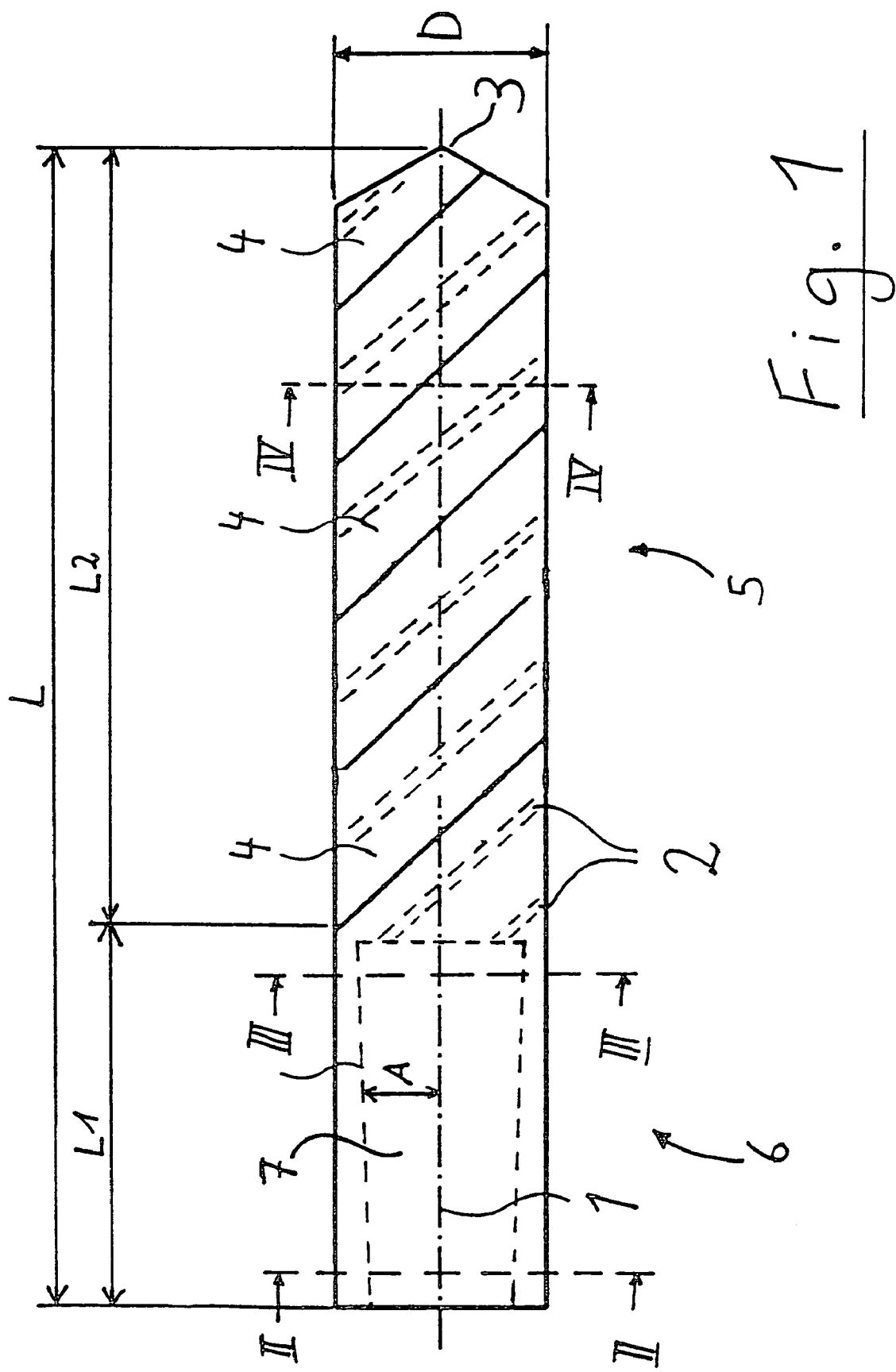
FIG. 1 shows a drill bit in profile.

In FIG. 1 there is illustrated, by way of example, a drilling rod for a rod-shaped tool for machining a workpiece. However, the present invention also embraces tools other than drilling rods. For example, milling rods and reaming rods may be mentioned.

The drilling rod consists of a sintered material, for example of steel powder, hard metal or ceramic. For producing the drilling rod, initially, for example, pasty sinter material is extruded. Guide channels 2 are incorporated in the rod eccentrically with respect to a rod centre axis 1 during extruding. The guide channels 2 serve in later operation of the drilling rod for the feed of a coolant or lubricant to a drill bit tip 3.

The produced rod is twisted during or after the extruding. The guide channels 2 thereafter extend helically around the rod centre axis 1. The twisting is preferably carried out after cutting the extruded rod to length.

In addition, chip chambers 4 at the outer side are formed in the sintered rod, preferably before the sintering, but in every case after stabilisation of the sinter material, for example after drying or pre-sintering the sinter material. The chip chambers also extend helically around the rod centre axis 1.

The chip chambers 4 define a chip chamber region 5. The end of the chip chambers 4 remote from the drill bit tip 3 represent the transition to a shank region 6. The shank region 6 does not have any chip chambers 4. It extends up to the end of the drilling rod remote from the drill bit tip 3. The chip chamber region 5 and the shank region 6 thus directly adjoin one another in the direction of the rod centre axis 1.

The shank region 6 extends over a shank length L1 and the chip chamber region 5 over a cutting length L2. The drilling rod thus has a total length L which corresponds with the sum of shank length L1 and cutting length L2. The ratio of shank length L1 to overall length L is, in trivial manner, less than 1. It lies at most between 0.25 and 0.66, as a rule between 0.33 and 0.50.

The drilling rod has a uniform outer diameter D. The chip chambers 4 extend from the outer diameter D slightly towards the rod centre axis 1. However, they have a minimum spacing a from the rod centre axis 1. The minimum spacing a usually amounts to at least 0.2 times the outer diameter D of the drilling rod.

The shank region 6 has a centre recess 7 which extends in the direction of the rod centre axis 1 and in the shank region 6 has a maximum spacing A from the rod centre axis 1. According to FIGS. 1 to 3, the maximum spacing A is larger than the minimum spacing a. Thus, in particular, it is at least as large as the minimum spacing a and also at least as large as 0.8 times the minimum spacing a. The centre recess 7 is preferably formed in the sintered rod when stabilised in shape, but not yet sintered. The centre recess 7 can be formed as, for example, a bore.

Due to removal of the sinter material from the shank region 6 before sintering of the sintered rod, the removed material can therefore be mixed again with binder and returned to the production process.

As a result of the relative dimension ratios the maximum spacing A typically amounts to 25 to 40% of the outer diameter D. However, 20% of the outer diameter D should not be fallen below and 45% should not be exceeded.

The guide channels 2 and the centre recess 7 are connected with one another in communicating manner. This is achieved by the fact that the eccentricity of the guide channel 7 is at most as large as the maximum spacing A.

Figure 2:
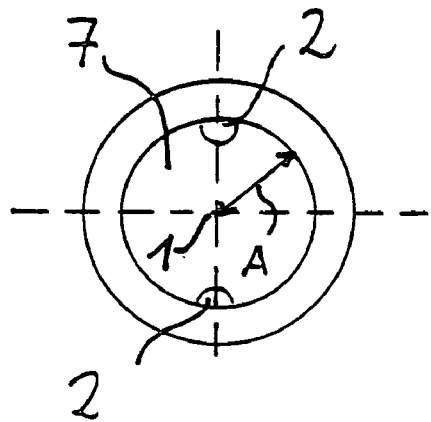
FIGS. 2–4 show sections through the drill bit of FIG. 1 along lines II—II, III—III and IV—IV, respectively.
Figure 3:
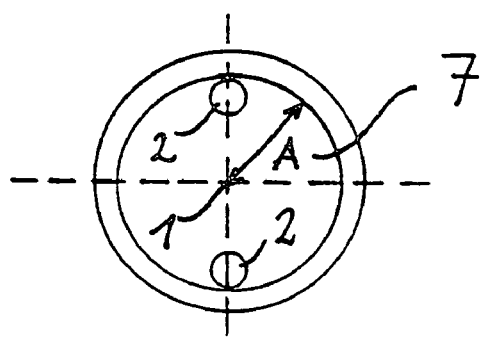
Figure 4:
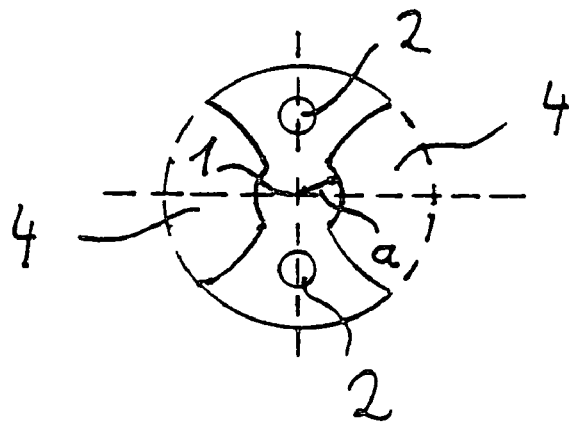

According to FIGS. 2 and 3 the centre recess 7 has in the shank region 6 a circular cross-section. The cross-section increases from the end of the shank region 6, which is remote from the drill bit tip 3, to the chip chamber region 5. The centre recess 7 thus extends slightly conically. It is thereby possible that an entrainer for the drilling rod engages not externally at the drilling rod (as usual), but is introduced into the centre recess 7 and clamped therein with the shank region 6.

Figure 5:
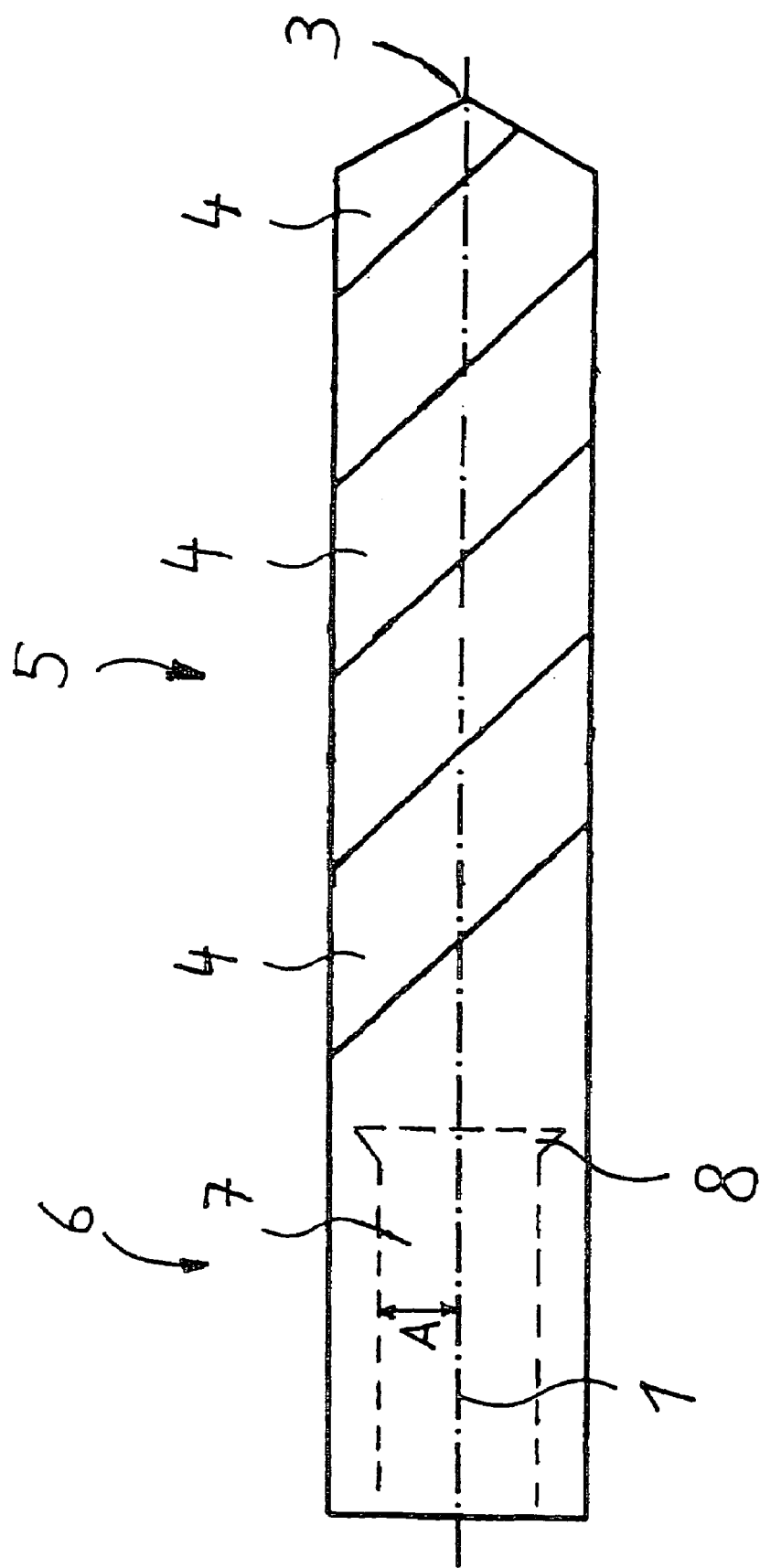
FIG. 5 shows a further drill bit in profile.

The drilling rod according to FIG. 5 substantially corresponds with the drilling rod according to FIGS. 1 to 4. In particular, the centre recess 7 also has, in the case of the drilling rod according to FIG. 5, in the shank region 6 a cross-section which in a part section 8 facing the chip chamber region 5 is greater than at its end remote from the chip chamber region 5. In the case of the drilling rod according to FIG. 5 the centre recess 7 is, however, constructed to be hammerhead-like or dovetail-shaped in the part section 8. In the remaining region it is formed to be cylindrical. However, the centre recess 7 could in a given case similarly extend slightly conically in the remaining part section.

Figure 6:
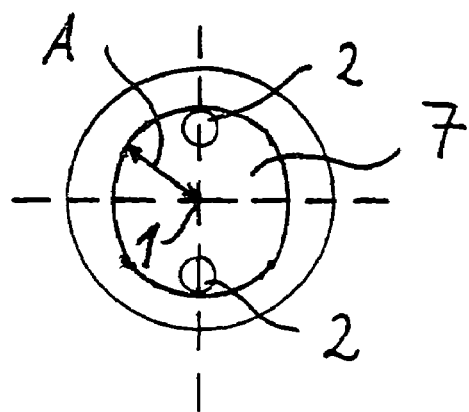
FIG. 6–8 show sections through the shank region of a further drill bit.
Figure 7:
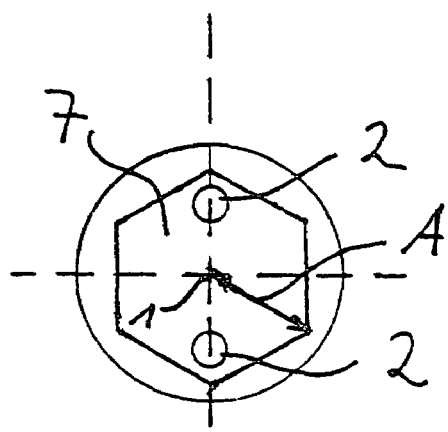
Figure 8:
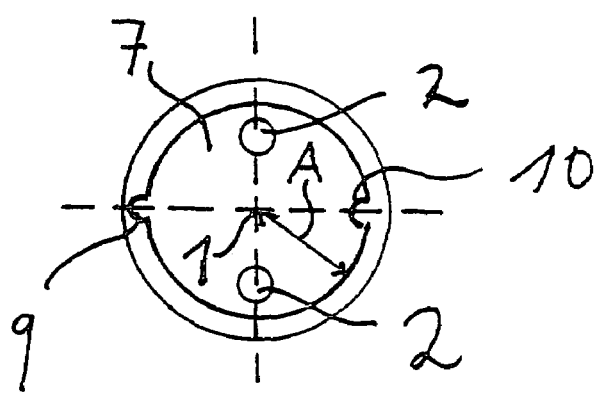
Figure 9:
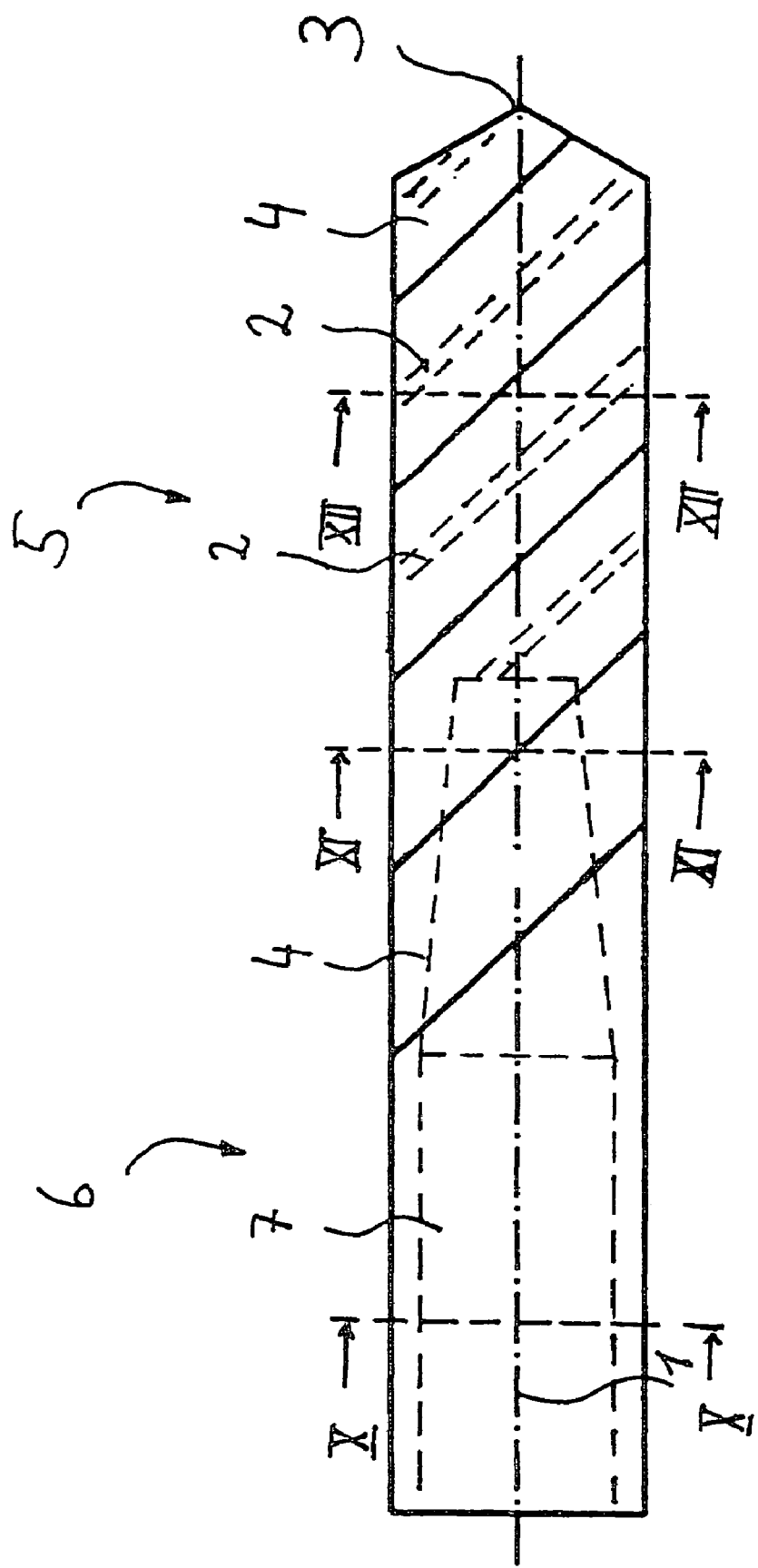
FIG. 9 shows a third drill bit in profile and FIGS. 10–12 show sections through the drill bit of FIG. 9 along lines X—X, XI—XI and XII—XII, respectively.

Further possible cross-sections of the centre recess 7 are illustrated in FIGS. 6 to 8, which could be used as desired in the drilling rods according to FIGS. 1 to 5. It is common to all of these drilling rods that the centre recess 7 has a non-circular cross-section in the shank region 6. In addition, it is common thereto that the guide channels 2 and the centre recess 7 are connected together in communicating manner.

According to FIG. 6 the cross-section in the shank region 6 is formed to be oval or elliptical. According to FIG. 7 the cross-section in the shank region 6 is polygonal. According to FIG. 8 the cross-section has a recess 9 and a projection 10, the latter, for example, lying opposite the recess 9. Optionally, also more than one recess 9 and/or more than one projection 10 could also be present. The form of embodiment according to FIG. 8 could optionally also be combined with one of the forms of embodiment according to FIGS. 6 and 7.

The drilling rod according to FIGS. 5 to 8 does not have any guide channels 2; However, it could also have such channels 2. Equally, the guide channels 2 could optionally be omitted in the case of the drilling rod according to FIGS. 1 to 4.

A further drilling rod is now illustrated in FIGS. 9 to 12, which can be produced in a manner of production different from the drilling rods according to FIGS. 1 to 8. In the case of this drilling rod, flowable sinter material is applied to a formed body. The sinter material can be, for example, pasty. The formed body can consist of, for example, metal, ceramic, plastics material or a readily meltable material (typically wax). Thereafter, the applied sinter material is dried or stabilised in shape in another manner, for example by pre-sintering. The formed body is then withdrawn from the sintered rod stabilised in shape—in a given case with rotation about the rod centre axis 1 relative to the sinter material stabilised in shape—or—in the case of a meltable material—melted out. The chip chambers 4 can alternatively be formed in the sintered rod before or after withdrawal or melting out of the formed body, optionally also after sintering of the sintered rod. The chip chambers 4 also extend helically around the rod centre axis 1 in the case of the drilling rod according to FIG. 9. The centre recess 7 also extends—at least in the chip chamber region 5—helically around the rod centre axis 1.

In this drilling rod the shape of the centre recess 7 (and as a rule also of the guide channels 2) is substantially determined by the shape of the formed body. It is thereby possible that the centre recess 7 extends over the shank region 6 in direction of the rod centre axis 1 as far as into the chip chamber region 5. Due to the non-circular cross-section it is then possible that the maximum spacing A in the chip chamber region 5 is also at least as large as the minimum spacing a. It can even be greater in the chip chamber 5 than the minimum spacing a.

Figure 10:
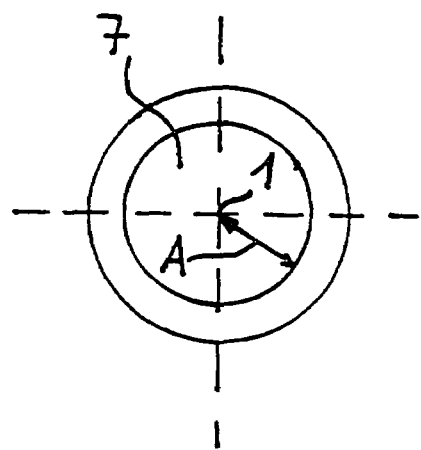
Figure 11:
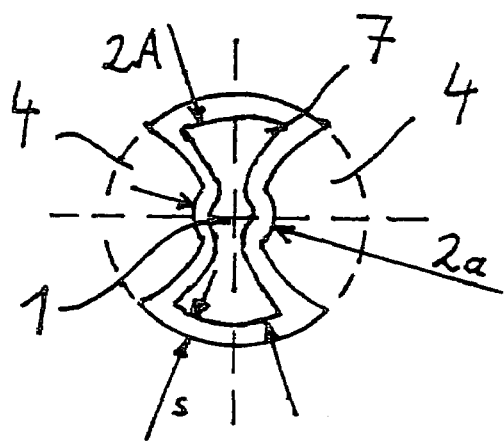
Figure 12:
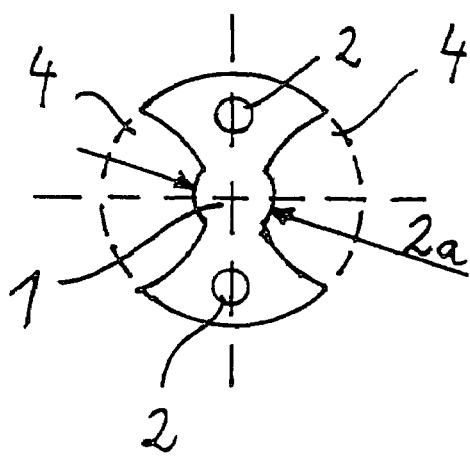

According to FIGS. 10 to 12 the centre recess 7 tapers towards the drilling tip 3 and gradually goes over into the guide channels 2. The centre recess 7 in that case extends as far as the drilling rod is kept material-free in the region of the rod centre axis 1. In the region in which the centre recess 7 is still present in the chip chamber region 5, the cross-section of the centre recess 7 is matched to an outer cross-section of the chip chamber region 5 in such a manner that the chip chamber region 5 overall has a substantially constant material thickness s.

In the form of embodiment according to FIGS. 9 to 12 the centre recess 7 in the shank region 6 is formed to be substantially cylindrical. The centre recess 7 could, however, also have a non-circular cross-section. Equally, in the shank region 6 it could have a cross-section in a part section facing the cutting region 5 which is greater than at its end remote from the chip chamber region 5. For this purpose the formed body would have to be correspondingly pre-shaped and capable of melting out. Alternatively or additionally, after removal of the shaped body from the sinter material stabilised in shape a subsequent processing of the centre recess 7 can also be carried out.

The guide channels 2 are, as already explained, determined by the form of the shaped body. In the region of the drill bit tip 3 the drilling channels 2 can, however, optionally also be formed in the drilling rod subsequently, for example by later drilling.

With the drilling rod according to the invention—or more generally the tool according to the invention for machining a workpiece—a substantial saving of material and weight can be achieved by comparison with conventional tools. Moreover, it is possible in simpler manner to provide a compact mounting for the tool in operation. Due to the larger cross-section of the centre recess 7 there additionally results a substantially reduced flow resistance for the coolant or lubricant. Notwithstanding the partly hollow construction of the drilling rod, the load-bearing capability and performance capability thereof, however, are substantially undiminished.

The invention claimed is:

1. A rod-shaped tool of sintered material for machining a workpiece, with a rod centre axis, a shank region and a chip chamber region adjoining the shank region in the direction of the rod centre axis; wherein the tool has, in the chip chamber region, at least one chip chamber at the outer side and encircling the rod centre axis and, there is no chip chamber in the shank region; wherein the chip chamber has a minimum spacing from the rod centre axis; characterised in that the tool has a closed centre recess which is material-free in the region of the rod centre axis, extends over the shank region and as far as into the chip chamber region, and the closed centre recess has a non-circular cross-section in the chip chamber region and, in the chip chamber region (5), has a maximum spacing from the rod centre axis (1) which is at least as large as the minimum spacing.

2. The tool according to claim 1, characterised in that the maximum spacing in the shank region is greater than the minimum spacing.

3. The tool according to claim 1, characterised in that the shank region has a shank outer diameter and that the maximum spacing in the shank region amounts to at least 0.2 times the shank outer diameter.

4. The tool according to claim 3, characterised in that the maximum spacing in the shank region amounts to at most 0.45 times the shank outer diameter.

5. The tool according to claim 1, characterised in that the maximum spacing in the chip chamber region is greater than the minimum spacing.

6. The tool according to claim 1, characterised in that the cross-section of the centre recess in the chip chamber region corresponds to the outer cross-section of the chip chamber region so that the chip chamber region overall has a substantially uniform material thickness in cross-section between the centre recess and the chip chamber.

7. The tool according to claim 1, characterised in that the centre recess extends substantially helically around the rod centre axis in the chip chamber region.

8. The tool according to claim 1, characterised in that at least one guide channel, which is arranged eccentrically with respect to the rod centre axis and which is connected in communicating manner with the centre recess, for a coolant or lubricant extends in a part section of the chip chamber region.

9. The tool according to claim 1, characterised in that the centre recess in the shank region has a circular cross-section.

10. The tool according to claim 1, characteriesd in that the centre recess in the shank region has a non-circular cross-section.

11. The tool according to claim 10, characterised in that the cross-section in the shank region is oval, elliptical or polygonal or has at least one recess or at least one projection.

12. The tool according to claim 1, characterised in that the centre recess in the shank region has a cross-section which is greater in a part section facing the chip chamber region than at its end remote from the chip chamber region.

13. The tool according to claim 12, characterised in that the centre recess has a slight conicity.

14. The tool according to claim 12, characterised in that the centre recess is formed to be hammerhead-like or dovetail-shaped in its part section facing the chip chamber region.

15. The tool according to claim 1, where in the rod is a drilling, milling or reaming rod.

* * * * *